Patented Aug. 25, 1953

2,650,250

UNITED STATES PATENT OFFICE 2,650,250

N-METHYLOL-p-VINYL BENZAMIDE

John Noel Milne, Epsom Downs, Donald Faulkner, Epsom, and Charles Edward Hollis, Ewell, England, assignors to The Distillers Company Limited, Edinburgh, Scotland, a British company No Drawing. Original application August 1, 1950, Serial No. 177,136. Divided and this application September 13, 1951, Serial No. 247,567. In Great Britain August 25, 1949

1 Claim. (Cl. 260—558)

This invention relates to a new polymerisable compound, para-vinylbenzamide, to its polymers and copolymers and to resins produced by treating it with formaldehyde before, during or after polymerisation or copolymerisation.

P-vinylbenzamide, as a derivative of styrene, will polymerise by addition polymerisation while by virtue of its amido-group it will enter into condensation reactions with formaldehyde its polymers, compounds yielding formaldehyde under the reaction conditions and compounds containing reactive hydroxy-methyl and similar groups.

This application is a division of application Ser. No. 177,136 filed August 1, 1950. Matter described but not claimed herein is claimed in said patent.

The new monomer may be prepared from para-cyanostyrene by hydrolysis as described in Example 1.

Example 1

A mixture of 6.5 gm. (0.05 mol.) of p-cyanostyrene, 46 ml. (0.4 mol.) of 30% hydrogen peroxide and 54 ml. of water was stirred vigorously, while a solution of 2 gm. (0.05 mol.) of sodium hydroxide in 15 ml. of water was added rapidly. A vigorous reaction set in and the temperature rose spontaneously until the mixture was almost at the boiling point. When the reaction slackened, a further 46 ml. (0.4 mol.) of undiluted 30% hydrogen peroxide was added and the mixture was heated on the water bath for 5½ hours. After standing, the solid product was filtered off and washed with water and, by repeated recrystallisation from water, pure p-vinylbenzamide was obtained in the form of colourless needles, M. Pt. 169–170° C. Elementary analysis showed the presence of carbon, hydrogen and nitrogen in the following percentages by weight:

C, 73.48; H, 6.45; N, 9.5. (Required for $C_9H_9NO$) C, 73.43; H, 6.17; N, 9.52.

The preparation of p-vinylbenzamide from p-cyanostyrene may also be carried out via p-vinylbenzoic acid and p-vinylbenzoyl chloride, as follows:

Example 2

8.8 gm. (0.06 mol.) of thoroughly dried powdered p-vinylbenzoic acid prepared by the method of Marvel and Overberger, J. A. C. S. 1945, 67, 2251, was treated with 14.2 gm. (0.12 mol.) of freshly redistilled thionyl chloride and the mixture was allowed to stand at room temperature in a flask from which moisture was excluded by means of a calcium chloride tube. Sulphur dioxide and hydrogen chloride were slowly evolved until, after about 60 hours, the originally pasty mass was converted to a mobile, pale brown liquid and the reaction was complete. Excess thionyl chloride was distilled off under reduced pressure by means of a water bath maintained at 25–35° C., leaving the crude acid chloride as a pale brown, mobile liquid which was used for the next stage without any purification.

The acid chloride was dissolved in 100 ml. of dry benzene, the solution filtered to remove traces of insoluble matter and dry ammonia bubbled in until no further precipitation of solid took place. More benzene was added from time to time, as the suspension of precipitated amide became so pasty as to prevent passage of ammonia gas.

The suspended solid was separated by filtration, washed with benzene and sucked dry. The product was shaken with 100 ml. of 5% sodium carbonate solution to remove any unchanged p-vinylbenzoic acid or acid chloride, filtered, washed with water and dried. The dry product was dissolved in 150 ml. of alcohol, treated with charcoal, filtered hot and poured into 700 ml. of boiling water. The aqueous alcoholic solution was boiled for a few minutes, again filtered hot and allowed to cool slowly. Finally, the amide which separated on cooling was filtered off, washed with water and dried in vacuo. The yield was 6.6 gm. (79% based on p-vinylbenzoic acid) of fine white needles which had M. P. 168° (not depressed on mixing with a sample of p-vinylbenzamide prepared by hydrolysis of p-cyanostyrene with alkaline hydrogen peroxide as described in Example 1).

P-vinylbenzamide, by virtue of its possession of a reactive vinyl group, may be addition-polymerised by various means, for example by heating, by the action of peroxides and other known polymerisation catalysts, or by the action of radiation of suitable wavelengths. The monomer may be polymerised alone in the pure state, or in solution in suitable solvents, or when emulsified or dispersed in a suitable medium, for example water. P-vinylbenzamide may also be copolymerised with various other monomers such as styrene, and materials copolymerisable with styrene. Pure poly-p-vinylbenzamide may be obtained as a hard, transparent resin, relatively insoluble in most solvents, probably owing to the highly polar nature of the amido-groups present along the polymer chain, the solubility behaviour depending to some extent on the molecular weight, i. e. on the conditions under which it is produced. For instance, when polymerised alone, the polymer is unattacked by boiling dimethyl formamide and slightly swollen by boiling cresol. When prepared by heating in a solution of toluene, polymers may be obtained which are believed to be of lower molecular weight and which dissolve completely in cresol. It is also possible that chemical cross-linking of the polymer may be induced under severe conditions by elimination of ammonia between amido-groups on adjacent chain molecules.

The following examples illustrate the production of the new polymers and copolymers:

Example 3

A sample of p-vinylbenzamide was sealed in a glass tube and heated to 180° C. for 2 hours. The powdered material melted to a homogeneous liquid and at the end of the polymerisation a hard, transparent, glassy resin was obtained, not melting at 200° C.

Example 4

A 1% solution of p-vinylbenzamide in toluene containing 1% by weight on the monomer of benzoyl peroxide was heated at 100° C. for 45 hours. The white precipitate of polymer which had formed was filtered off, washed with alcohol to remove traces of unpolymerised monomer and dried. The product was soluble in hot cresol and could be pressed to a clear pale yellow glassy mass at a temperature of 250° C. and a pressure of 1 ton per square inch. The polymer obtained in this example was of lower molecular weight than that obtained in Example 3, the latter material only being gelatinised by boiling cresol.

Copolymerisation of p-vinylbenzamide with other monomers may be carried out by reacting the pure materials alone, in solution in a suitable solvent, or emulsified or dispersed in a suitable medium, for example water. Since p-vinylbenzamide is a solid of high-melting point and its solubility in various monomers at reaction temperature is not always such that homogeneous starting mixtures of the desired composition by weight can be obtained, it is often advantageous to carry out copolymerisation in solution or emulsion, under which conditions copolymers of widely varying composition can be obtained, irrespective of the solubility of p-vinylbenzamide in the other monomer. The amido-group of p-vinylbenzamide is sufficiently resistant to hydrolysis to permit of emulsion polymerisation operations. Copolymers prepared from 95% by weight styrene and 5% by weight p-vinylbenzamide prepared in emulsion were found to contain 0.47% of nitrogen compared with the theoretical amount of 0.48%, indicating that all the initial $CONH_2$-groups were still present.

Example 5

A mixture of 10 parts by weight of p-vinylbenzamide, 90 parts of styrene and 1 part of isopropylbenzene hydroperoxide was sealed in a glass tube and heated for 5 minutes at 150° C., when a clear solution was formed. The tube was further heated at 100° C. for 18 hours when a clear, glassy copolymer was obtained which was soluble in benzene and insoluble in alcohol.

Example 6

A mixture of 20 gm. styrene, 0.3 gm. p-vinylbenzamide and 0.02 gm. benzoyl peroxide was sealed in a glass tube which was heated for 17 hours at 50° C. and then for 24 hours at 80° C. A perfectly clear, transparent, homogeneous solid was obtained which was completely soluble in benzene to form a clear, viscous solution. A purified sample of the polymer was obtained by slowly running the benzene solution into an excess of methanol with vigorous stirring, the precipitate being washed with methanol and thoroughly dried. The second order transition point ($T_m$) of the copolymer, as determined by the thermal expansion method, was 97.6° C.; this may be regarded as a standard measure of softening point.

Example 7

An emulsion was made of the following:

| | Parts by weight |
|---|---|
| Styrene | 9 |
| Aqueous sodium stearate solution, 2% w./v. | 20 |
| Aqueous ammonium per sulphate, 2% w./v. | 1 |
| P-vinylbenzamide | 0.09 | by vigorous shaking, and was sealed under air in a glass tube. Polymerisation was carried out by heating the emulsion for 21 hours at 50° C., agitating by continuously rotating the tube end-over-end. A uniform dispersion or latex of copolymer was obtained, from which residual monomer was removed by steam stripping. The polymer was precipitated by pouring the stripped latex into 500 parts of water, heating to boiling and adding a little dilute hydrochloric acid. The copolymer was dried at 40° C. in vacuo and was found to have a second order transition point of 98.5° C.

Apart from the intrinsic value of the novel polymer and copolymers of this invention as high melting resins suitable for a variety of applications in the plastics art, they have the valuable property of being rendered insoluble in common solvents by the action of formaldehyde, its polymers, or substances yielding formaldehyde with subsequent or simultaneous heating treatment, the process being conveniently carried out by mixing the powdered resin with paraformaldehyde prior to hot pressing, or by treatment with aqueous formaldehyde following by drying and baking. It is reasonably certain that the conversion of initially soluble polymers and copolymers derived from p-vinylbenzamide into insoluble products is due to a cross-linking reaction taking place when formaldehyde reacts with the amido-group present in the polymer, leading to the formation of methylol-amido-groups which may eliminate water on heating, to form methylene or other bridges between amido-groups on adjacent chains, although this theory as to the nature of the reaction does not form part of the invention. Foils, films or fibres made from polymers or copolymers of p-vinylbenzamide may be treated by soaking in aqueous formaldehyde, following by a baking process.

The following example illustrates the cross-linking of a copolymer by means of aqueous formaldehyde:

Example 8

A film was cast from a solution in benzene of the copolymer described in Example 5 by spreading on a glass plate and allowing the solvent to evaporate. Samples of the film were immersed for 24 hours at 20° C. in (a) 40% formaldehyde solution slightly acidified with hydrochloric acid and (b) 40% formaldehyde solution made slightly alkaline with caustic soda.

The treated films were then removed, washed with water, dried and baked for 1 hour at 100° C. They were then found to be insoluble in benzene but retained their original clarity.

By way of comparison, a film of the copolymer which had not been subjected to formaldehyde treatment remained soluble in benzene after baking.

*Example 9*

A sample of the precipitated copolymer prepared as in Example 6 was soaked for 17 hours in an excess of approximately 35% w./v. formaldehyde solution previously made slightly alkaline by the addition of a few drops of dilute sodium carbonate solution. After soaking, the copolymer was dried in vacuo at 40° C. and baked in an air oven at 40° C. for 24 hours. The polymer was then no longer soluble in benzene, although it was highly swollen in this solvent.

*Example 10*

A sample of the copolymer obtained as in Example 7 was soaked in alkaline formaldehyde solution, as described in Example 9. After drying in vacuo at 40° C., the treated copolymer was baked in an air oven at 100° C. After 3 hours' baking, the sample of the treated copolymer was found to be insoluble in benzene and in N-dimethyl formamide. Stiff, opaque gels only were formed. The treated polymer had a second order transition point of 103.3° C.

The formaldehyde treatment may also be carried out simultaneously with polymerisation, although in this procedure the presence of formaldehyde may tend to inhibit polymerisation in some cases. The following example illustrates this process:

*Example 11*

An emulsion was made of the following:

| | Parts by weight |
|---|---|
| Styrene | 9 |
| Aqueous sodium stearate solution, 2% w./v. | 20 |
| Aqueous ammonium persulphate, 2% w./v. | 1 |
| P-vinylbenzamide | 0.09 |
| Formaldehyde, 36% w./v. | 0.5 |

The polymerisation, precipitation and drying of the polymer were carried out in precisely the same manner as described in Example 7. The polymer had a second order transition point, $T_m$, of 100° C. It was insoluble in benzene or in dimethyl formaldehyde, but was highly swollen to give an almost clear gel.

A sample of the polymer, after being baked for 72 hours at 100°, was more resistant to benzene and dimethylformamide; the second order transition point, after baking, was substantially unchanged at 101.8° C.

Alternatively, according to a modified form of this invention, preformed compounds obtained by the reaction of formaldehyde with p-vinylbenzamide such as N-methylol-p-vinylbenzamide may be polymerised alone or copolymerised with styrene or other comonomers and the resulting polymer or copolymer subsequently cross linked by heating, as shown in Example 12.

*Example 12*

| | Parts by weight |
|---|---|
| P-vinylbenzamide | 2 |
| 10% sodium carbonate solution | 0.5 |
| Formaldehyde, 36% w./v. | 5 |
| Water | 5 |

The above mixture was warmed to 80° C. for 10 minutes and allowed to stand 18 hours at 50° C. Excess formaldehyde and water were then removed by warming under reduced pressure. The product was a white micro-crystalline powder, M. Pt. 128–9° C., N content 7.4% (Kjeldahl), probably mainly N-methylol p-vinylbenzamide.

30 parts by weight of 2% sodium stearate solution containing 0.1% w./v. of ammonium persulphate and 135 parts by weight of styrene were then added and the containing vessel was sealed. An emulsion was made by vigorous agitation and polymerisation was carried out by heating for 24 hours with continuous agitation in a thermostat maintained at 50° C. After steam stripping to remove residual monomer, the polymer was obtained by precipitating and drying in the usual manner.

By way of comparison, a sample of polystyrene was prepared in a precisely analogous manner, the only differences being that the N-methylol vinylbenzamide was omitted and the time of heating increased to 42 hours to ensure complete polymerisation. A sample of this polymer was soaked for 27 hours in 36% w./v. formaldehyde solution made alkaline by the addition of a small amount of dilute sodium carbonate solution. The polymer was then washed in distilled water and dried in air. It was found to have a second order transition point $T_m$ of 93.8.

Samples of (a) the copolymer of styrene and N-methylolvinylbenzamide and (b) formaldehyde-treated styrene polymer were then baked for 24 hours in an air oven at 100° C.

The untreated polystyrene sample was completely soluble in benzene to give a clear viscous solution, the sample (b) which had been treated with formaldehyde and subsequently baked, showed no detectable difference in appearance or benzene solubility and, as would be expected, it appeared to be substantially unchanged by this treatment, having a $T_m$ of 92.7.

The copolymer (a), on the other hand, both before and after heat treatment was insoluble in benzene, but was swollen to give an opaque gel. After heat treatment, the value of $T_m$ was 99° C.

*Example 13*

This example illustrates the method of crosslinking a styrene-p-vinylbenzamide copolymer by hot milling with a compound capable of giving free formaldehyde, namely para-formaldehyde. A mixture of 20 parts by weight styrene, 0.2 part by weight p-vinylbenzamide and 0.02 part by weight benzoyl peroxide was heated for 48 hours at 80° C. to give a transparent, homogeneous copolymer. This was readily pressed at 150° C. to give a clear, colourless sheet. Samples of the pressed polymer were readily soluble in benzene to give a clear solution.

5 parts by weight of the copolymer were mixed with 0.5 part of paraformaldehyde and milled on steam-heated rolls at 160° C. for 10 minutes. The sample, after milling, was insoluble in benzene and dimethyl formamide.

In addition to formaldehyde and its polymers, other reactive methylol-group-containing materials may be employed as cross-linking agents in substantially the same way, amongst which may be mentioned dimethylolurea, hexamethylolmelamine and condensation products of formaldehyde and phenols which liberate formaldehyde on heating; ethers derived from such compounds, such as hexamethoxymethylmelamine, may also be employed.

While only styrene has been exemplified as comonomer, other materials copolymerisable with styrene may be used under substantially the same conditions as they are with the latter monomer, including diene hydrocarbons such as butadiene, acrylic esters such as ethylacrylate, methacrylic esters such as methylmethacrylate, maleic anhydride, drying oils such as linseed and tung oils and their fatty acids, polymerisable unsaturated alkyd resins such as polyethylene glycol maleate, and oil-modified alkyd resins.

We claim:

The substance N-methylol-p-vinyl benzamide.

JOHN NOEL MILNE.
DONALD FAULKNER.
CHARLES EDWARD HOLLIS.

References Cited in the file of this patent

UNITED STATES PATENTS

| Number | Name | Date |
|---|---|---|
| 2,500,025 | Dickey et al. | Mar. 7, 1950 |
| 2,520,917 | Dickey et al. | Sept. 5, 1950 |

OTHER REFERENCES

Matsui: "J. Soc. Chem. Ind. Japan," vol. 46 (1943), Supplemental Binding 125, p. 126.

Snyder et al.: "J. Am. Chem. Soc.," vol. 71 (Mar. 1949), pp. 1057 and 1058.

Chem. Abstr., vol. 44 (1950), pp. 9187 and 9188.